Nov. 25, 1930.     W. F. MacGREGOR ET AL     1,782,995
SACK CHUTE FOR HARVESTER THRASHERS
Filed May 3. 1927     2 Sheets-Sheet 1
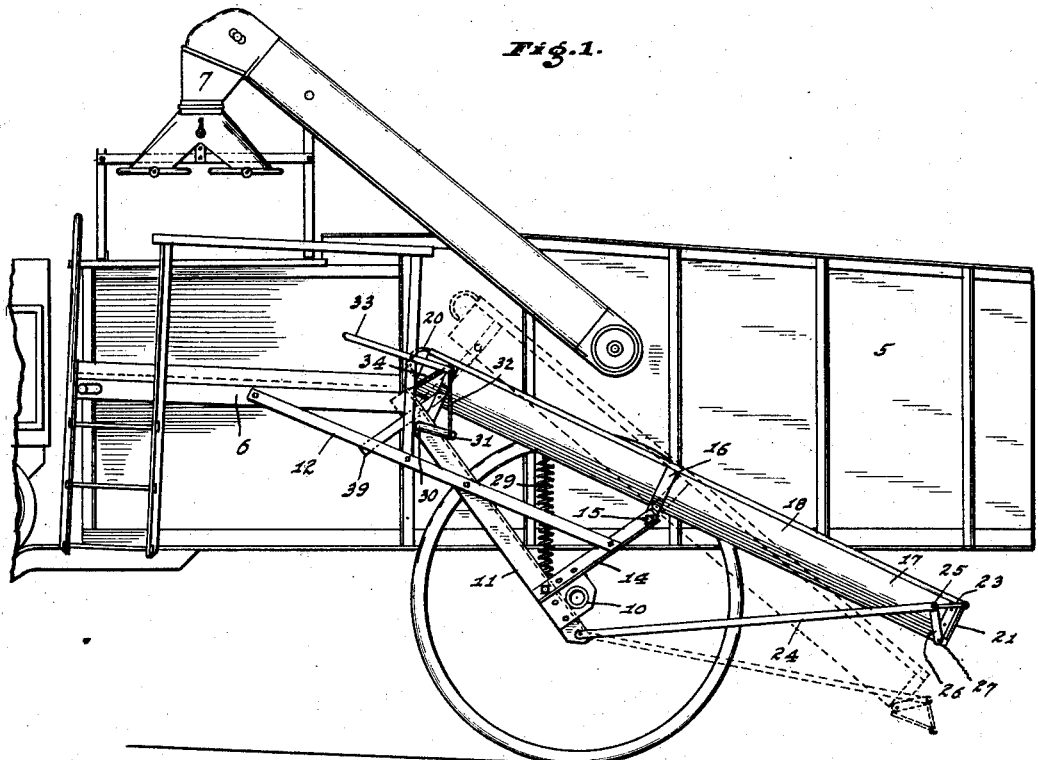
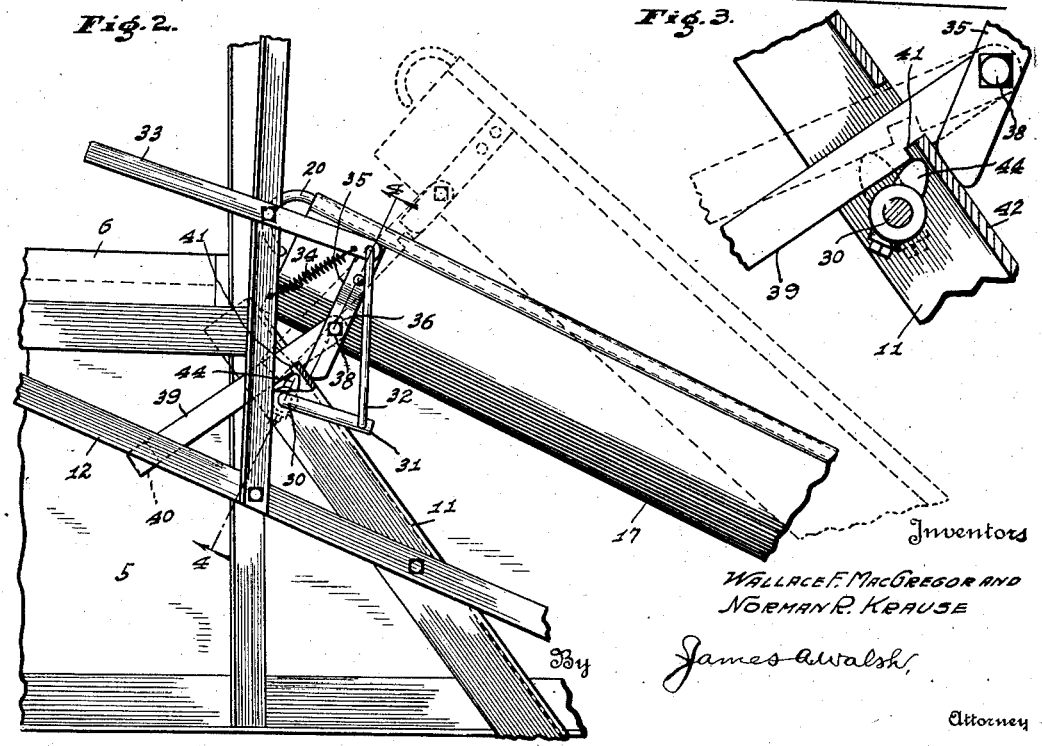
Inventors
WALLACE F. MacGREGOR AND
NORMAN R. KRAUSE
By James A. Walsh
Attorney Nov. 25, 1930.  W. F. MacGREGOR ET AL  1,782,995
SACK CHUTE FOR HARVESTER THRASHERS
Filed May 3, 1927    2 Sheets-Sheet 2
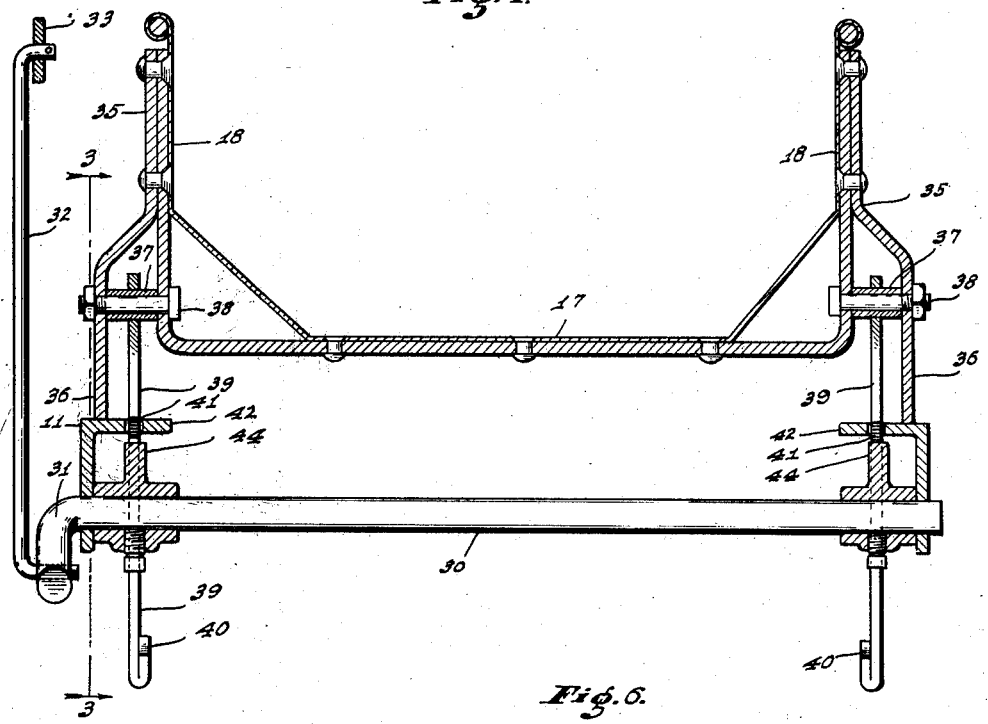
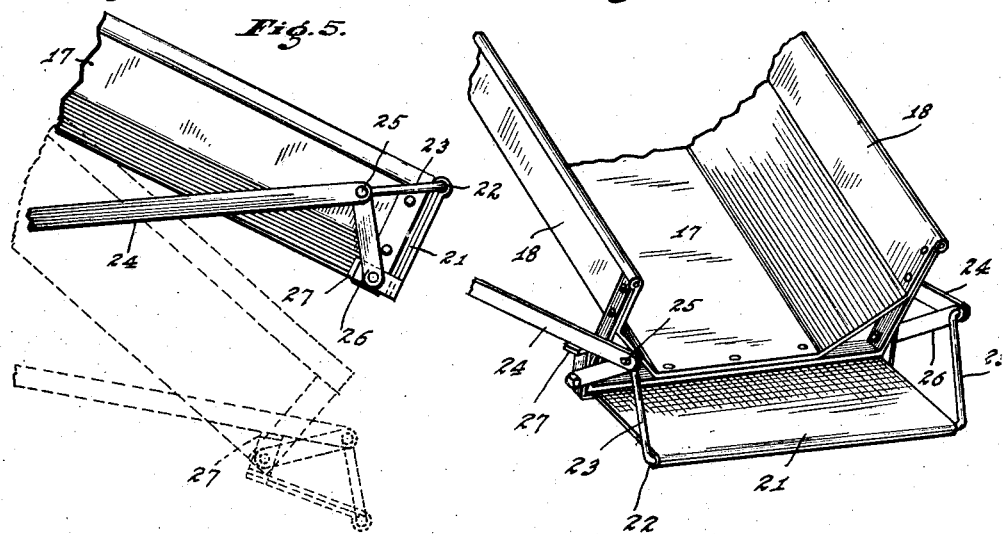
Inventor
WALLACE F. MACGREGOR AND
NORMAN R. KRAUSE
By James A. Walsh
Attorney Patented Nov. 25, 1930

1,782,995

UNITED STATES PATENT OFFICE

WALLACE F. MacGREGOR AND NORMAN R. KRAUSE, OF RACINE, WISCONSIN, ASSIGNORS TO J. I. CASE COMPANY, OF RACINE, WISCONSIN, A CORPORATION OF WISCONSIN

SACK CHUTE FOR HARVESTER THRASHERS

Application filed May 3, 1927. Serial No. 188,577.

In the operation of harvesting machinery, particularly of the type comprising a combined harvester and thrasher designed to travel through fields to cut and thrash grain simultaneously, an example of which is disclosed in the MacGregor Reissue Letters Patent No. 16,378, dated July 6, 1926, it is essential that the grain as it is being thrashed and constantly discharged from the thrashing element of the combined machine shall be instantly deposited into vehicles or sacks to be conveyed from the machine, and in practice in many localities it is preferred to sack the grain upon its discharge from the thrasher. In this latter situation it is our object to provide an improved sack chute capable of efficiently receiving the sacked grain from the thrasher and depositing it evenly in groups along the path of travel of the machinery. We are aware that sack chutes for the purpose are disclosed in prior patents, and which under normal soil conditions may be effective for the purpose, but in extensive field practice, where the soil has been hilly and contained irregular depressions, we have found that a sack chute so mounted as to have a dumping effect overcomes certain deficiencies in operation which exit in the types of chutes of which we are aware, and assures delivery of the sacked grain in timely order whether the machinery is traveling upwardly or downwardy or laterally inclined due to ground irregularities. That is to say, where a sack chute is in fixed relation to the thrasher it must assume a steep or abnormal inclination when the machinery is traversing hilly territory, which causes the sacks to be precipitated down the chute rapidly and forcibly, with the result that the end gate of the chute and parts associated therewith become broken or distorted, or a sack will become jammed against the end gate and assume an upright position, causing the following descending sacks to topple thereover in irregular condition upon the ground, so that there is such retardation of the sacks as to make alined delivery from the chute uncertain with the consequent extra labor of collecting the sacks by vehicles, whereas the object is to deliver such sacks in alined groups so that they may be collected without frequent stops of the vehicles employed for hauling them from the fields and thus expedite the work of collection. On the other hand, when the machinery is descending from an elevation the end of a fixedly secured chute will be a considerable distance from the ground, the inclination of the chute not being sufficient to deliver the sacks in other than a sluggish manner, and in passing through the rear end of the chute the sacks must fall such distance as to cause the bursting thereof and consequent loss of grain. The object of our invention, therefore, is to so improve sack chutes for the purpose as to obviate the disadvantages described, and which we accomplish in the manner as will now appear.

In the accompanying drawings, forming part hereof, Figure 1 is a side elevation of a thrasher with our improved sack chute mounted thereon; Figs. 2 and 3 details of a portion of the chute; Fig. 4 a cross section on the dotted line 4—4 of Fig. 2 through the upper portion of the sack chute; and Figs. 5 and 6 are enlarged details of the lower end of the chute.

In the drawings the numeral 5 indicates a thrasher, which is provided with a platform, 6, positioned on the side thereof from which the thrashed grain is delivered into sacks from the sacker elevator, 7, the open end of which sacks when filled with grain are sewed by an attendant on the platform. Extending laterally from the thrasher 5 is a chute support, preferably in the form of a hollow shaft, 10, secured to the axle of the thrasher, upon which support we pivotally mount arms, 11, the opposite ends of which are connected to the platform 6, the purpose of pivotally connecting the lower ends of the arms 11 to the shaft 10 being to permit the rocking of said shaft together with the axle of the thrasher when the latter is being raised and lowered during field operations, as fully disclosed in the patent hereinbefore referred to, but it will be understood that the mounting of said arms and shaft may be modified to suit different conditions. Said arms 11 are further secured to the platform 6 by brace-rods, 12, which are connected to the platform and extend downwardly and terminate beyond the point where they cross said arms. The arms 11 and said brace-rods 12 are connected to the chute supports 14, carrying the rod, 15, and upon which rod 15 hinge-straps, 16, are pivotally mounted and to which straps the sack chute, 17, is secured, this connection being so located in relation to the chute that the latter will be overbalanced toward its lower end for a purpose to appear. Said chute 17 is preferably made of sheet metal having side walls, 18, provided at their upper ends with guards, 20, to prevent tearing of sacks over corners or edges of the chute, and the lower end of said chute is provided with an end-gate, 21, hinged thereto, the upper end of the gate being rolled about or otherwise secured to a rod, 22, having extensions, 23, connected to gate operating links, 24, which latter are pivotally mounted in the arms 11, said links being pivotally connected, at 25, by the short links, 26, the movement of the gate operating links being controlled by stops, 27, as indicated in Fig. 6. The arms 11, brace-rods 12, and supports 14, constitute a stable framework for supporting the chute and the heavy sacks of grain passing therethrough, and in order to retain the chute in normal position, as indicated by the full lines in Fig. 1, we connect the chute to the framework by a tension spring, 29.

In order to operate the chute we provide trip mechanisms arranged and operating as follows: In the arms 11 we mount a cross-shaft, 30, having an arm, 31, thereon, which is connected by a link, 32, to a trip-lever handle, 33, the movement of the latter being controlled by a spring, 34, connected to the platform structure. A strap-iron, 35, connected to the chute 17 is offset, at 36, and between the same and the chute body are latch pivot-pipes, 37, supported on the bolts, 38. Latch-bars, 39, each having a stop 40, are connected to the strap-iron 35 the latch-bar having a recess, 41, therein adapted to engage the web, 42, of arm 11, by which the trip mechanism is normally held in engagement and the chute 17 sustained in locked position, as indicated in Fig. 1. It will be understood that the harvester-thrasher is moving through the field and that the thrashed grain is being constantly delivered into sacks positioned under the sacker elevator on the platform, and as the sacks are filled and the open ends thereof sewed they are tossed or tumbled into the sack chute in lengthwise position, and when a predetermined number of sacks, three for example, are placed in the sack chute it is desirable to deposit them in alined groups upon the ground to be collected by vehicles following the trail of the thrasher. In this circumstance the lever handle 33 is pushed downwardly, which actuates link 32 to rock cross-shaft 30, and as the latter is provided with dogs, 44, as indicated in full and dotted lines in Fig. 3, these dogs engage the combined latch-bars and stops 39, 40, and the latter become disengaged from contact with arms 11, so that as lever handle 33 is tripped the locking mechanism is disengaged and also chute 17 is disengaged to swing by gravity into the position indicated in dotted lines in Figs. 1 and 2; and simultaneously with the downward movement of the chute the gate-operating links 24, through their pivotal connection with arms 11 and end-gate 21, throw said gate outwardly and opens the same so that the sacks are free to slide from the chute, the lower rear end of which is then close to the ground and permits the sacks to fall gently, after which occurrence the chute being relieved of its load is pulled back to normal position by the spring 29, when the latch-bars 39 are returned to locked position on the arms 11, it being understood that the lower turned ends 40 of said latch-bars act as stops to engage the arms 11 and thus limit the upward movement of the chute, and as the chute returns to normal position the spring 34 connecting the lever-handle to the platform structure exercies a returning influence upon said handle and consequently upon the trip mechanisms associated therewith, so that when the chute has delivered its load the mechanisms described return and lock the same in normal position for receiving a further supply of sacks, and also that in the return movement of the chute the end-gate becomes closed through the action of the links 24. It will be understood, therefore, that upon tilting the chute when laden with sacked grain the end-gate becomes automatically opened and the delivery of the sacks is free and unobstructed, and therefore may be deposited in alinement in groups to be readily collected, and that no matter whether the machinery is ascending or descending inclinations the lower end of the chute can always be instantly brought close to the ground for delivering sacks without danger of bursting the same or depositing them in irregular order.

We claim as our invention:

1. In a sack delivering chute, a trough-like receptacle, an end-gate thereon, a frame, means connecting said frame and chute, a shaft mounted in the frame, a lever-handle, a link connecting said shaft and handle, a latch-bar, means connecting the latch-bar to the chute, and means for releasing and locking the latch-bar as said handle is actuated to adjust said chute.

2. In a sack delivering chute, means for pivotally mounting the same on a thrasher to assume a downwardly inclined position when loaded with sacks, an end-gate to retain sacks while being loaded into the chute, means for retaining the chute in fixed position while being loaded, means for releasing the chute when loaded to increase its downwardly inclined position for delivering sacks, means for automatically returning the chute to sack receiving position, and means for automatically opening the end-gate outwardly and downwardly to form a continuation of the chute for facilitating delivery of sacks therefrom.

3. In a sack chute, a supporting frame therefor, means for rockingly connecting the frame to a thrasher whereby the chute may be adjusted to sack receiving and delivering positions, an end-gate hinged to the lower end of the chute and adapted to swing outwardly and downwardly therefrom, means for releasing said chute whereby it may be swung from normal to a second position, means for automatically opening said end-gate upon the swinging of the chute and closing the gate upon return of the chute from second to normal position, and yielding means connecting the frame and chute for automatically returning the same to normal position.

4. In a sack-chute, an end-gate hinged thereto, means for releasing the chute whereby it may be swung in one direction, means for automatically opening the end-gate outwardly and downwardly during the swinging movement of the chute and for closing the gate when the chute is swung in the opposite direction, and a spring associated with the chute for returning the latter to sack receiving position.

5. The combination, with a sacking platform, of a sack-chute pivotally mounted substantially midway of its length on a thrashing machine and having its upper end communicating with the platform, means for engaging and disengaging the chute in relation to the platform, a hinged end-gate at the lower end of the chute, means associated with the chute and the gate for automatically opening and closing the gate as the chute is swung away from and toward the platform, and yielding means for automatically returning the chute to sack receiving position.

6. The combination, with a sacking platform, of a sack receiving and delivering chute supported by a thrashing machine and embodying a gate, means for locking the chute to the platform in sack receiving position, means for releasing the locking means whereby the chute may be swung to sack delivering position, and means associated with the gate and the chute for opening and closing said gate simultaneously with the swinging action of the chute.

7. In a sack-chute for a thrashing machine, means for pivotally connecting the chute thereto, an end-gate hinged to the lower end of the chute, means for automatically opening the gate upon swinging the chute in one direction and automatically closing said gate when the chute is swung in an opposite direction, and yielding means for automatically returning the chute to sack receiving position.

8. In a sack delivering chute, a frame for supporting the chute, means for pivotally connecting the chute substantially midway of its length to the frame, trip mechanism for securing one end of the chute in sack receiving position, means for disengaging the trip mechanism whereby the chute will become overbalanced and tilted to sack delivering position, means connecting the frame and the chute for automatically returning the latter to sack receiving position, an end-gate on the chute forming a continuation thereof when opened, and means associated with the gate and chute for automatically opening and closing the gate as the chute tilts.

9. In a sack chute, a supporting frame therefor, means for rockingly supporting the frame upon a thrasher whereby said chute may be adjusted to sack delivering and receiving positions, a spring connecting the frame and chute for automatically returning the chute to sack receiving position, an end-gate hingedly secured to the lower end of the chute and adapted to be swung outwardly and downwardly therefrom to form a continuation of the chute, and means associated with the gate and the chute whereby as the chute is being tilted the gate will be automatically opened and closed during the swinging movement of the chute.

10. In a sack chute, a supporting frame therefor, means for rockingly connecting the frame to a thrasher whereby the chute may be adjusted to sack receiving and delivering positions, means for locking the chute in sack receiving position and also for releasing said chute whereby it may be swung into sack discharging position, a gate hinged to the lower end of the chute and adapted to swing outwardly therefrom, means for automatically opening and closing the gate, and yielding means for automatically returning the chute to sack receiving position and whereby the chute simultaneously actuates said opening and closing means to return the gate to closed position.

In testimony whereof we affix our signatures.

WALLACE F. MacGREGOR.
NORMAN R. KRAUSE.